Figure 1:
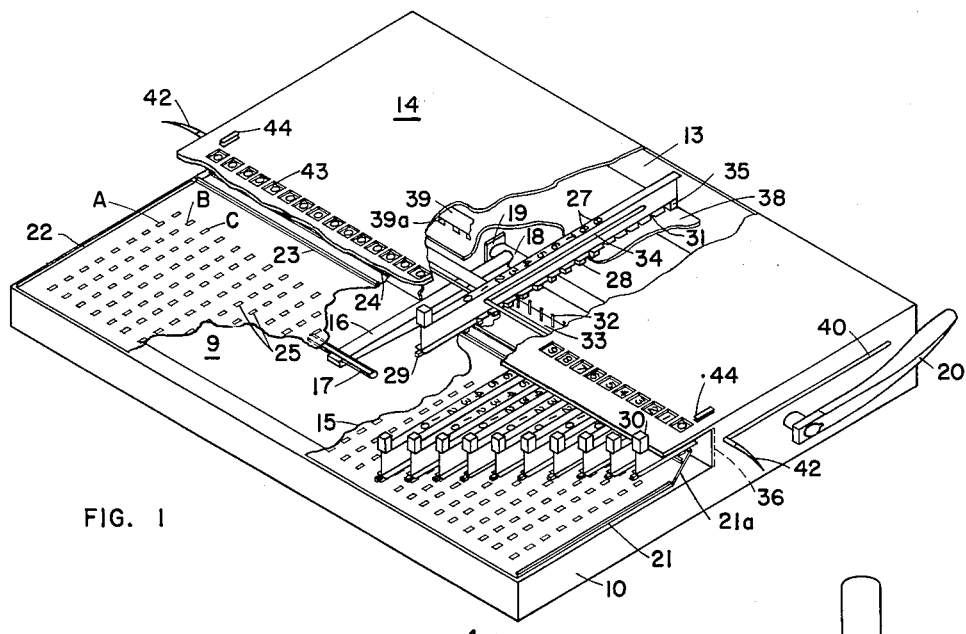

Aug. 21, 1962  A. H. EDBURG, JR  3,049,989
RECORD PUNCHING MACHINE

Filed Oct. 7, 1958  2 Sheets-Sheet 1

INVENTOR:
ANTON H. EDBURG, JR.
BY: Oswald H. Wilmore
HIS ATTORNEY

Aug. 21, 1962    A. H. EDBURG, JR    3,049,989
RECORD PUNCHING MACHINE
Filed Oct. 7, 1958    2 Sheets-Sheet 2

INVENTOR:
ANTON H. EDBURG, JR.
BY: *Oswald H. Milmore*
HIS ATTORNEY 3,049,989
RECORD PUNCHING MACHINE
Anton H. Edburg, Jr., Midland, Tex., assignor to Shell Oil Company, a corporation of Delaware
Filed Oct. 7, 1958, Ser. No. 765,887
9 Claims. (Cl. 101—19)

The invention relates to record-issuing machines operable to punch holes in a plurality of columns of a record to represent data by the positions of the holes within the columns. It further provides a machine which can print the data in readable numbers or letters onto the record simultaneously with the punching operation. The machine is particularly suitable for punching holes in prescored cards, but is not limited to such application.

There is need for an inexpensive and portable record-issuing machine which can record data in machine-sensible form at the data-source. Such a device would be used to record technical, scientific, financial, business and other data at the place where the data become available, without need to record the data and subsequently transcribe it onto punched records, such as cards, on an office-type machine such as a key-punching machine which has one key for each data value and each key controls the punching in all columns. This would result in improved accuracy and reduce delays in transmitting such data, making them available sooner for analyses and reports. Mark-sensing cards are often not suitable, due to the difficulty in reading and verifying the card and the possible lack of reliability in marking and sensing the card.

This need is met in part by the use of prescored cards, wherein potential positions on a card are prescored to permit punching with a manual punching tool or stylus which can be inserted successively into selected guide holes of a template when the prescored card is placed between such template and a punching board. While simple and inexpensive, it is subject to the limitations that considerable time is required to locate the correct holes in the template, that there is a risk of error, that verification of the punched card for errors is inconvenient in that the data are not visibly printed, that the preparation of each duplicate record requires as much time as the first record. Related to the last-mentioned limitation is the need, when preparing a series of related cards, to find the locations of all holes on each card, even when some or most of the data are the same as on a previous card.

It is an object of this invention to provide a simple, inexpensive, and light-weight machine for recording data by perforating a record of the type wherein all of the data can be entered prior to making any perforations and all of the several perforations are made thereafter.

Other objects are to provide a record-issuing machine of the type indicated wherein any desired number of identical records can be prepared without resetitng the machine, and to provide a machine wherein all of the data to be recorded can be read and verified before punching the data onto the card.

In summary, the record-issuing machine comprises a punch or die plate having a number of holes arranged in columns and situated at potential punching positions, a plurality of punches each of which is movable along a column and is adapted to enter any of the several holes of a column, and a plurality of individually settable keys, one for each column, which can be set manually without causing immediate punching, to positions corresponding to the data values to be punched within the respective columns, each of the said keys being operatively connected to a punch to cause the said data values to be punched.

In the embodiment to be described the punching of the several columns of the record is effected simultaneously; in this case the said punch or die plate has holes arranged in as many columns as are to be punched in one operation, the said keys are punch bars to each of which one of the said punches is attached, the said bars being movable to position the punch thereon over any selected hole of a row, and means are provided for effecting an approach motion between the punches and the plate for perforating a record, such as a card, preferably a prescored card, at each hole of the plate which is aligned with a punch.

In the preferred embodiment the machine has a plurality of different type elements for printing on the record selected characters which correspond to the punched data, preferably simultaneously with the corresponding punching. Suitable inking means, such as a ribbon, are provided. In the case of the single-cycle machine, wherein the punch bars are slidable to position the punches over selected holes in the several columns, the type elements are conveniently fixed in longitudinally spaced relation along each type bar on the side thereof toward the die plate, which carries a printing ribbon in a guide above the record, whereby the position occupied by each punch is printed onto the record in a row transverse to the columns. Further, the bars have directly readable indicia whereby the positions of the bars can be noted visually and verified before operating the machine to bring the plate and punches together.

Figure 2:
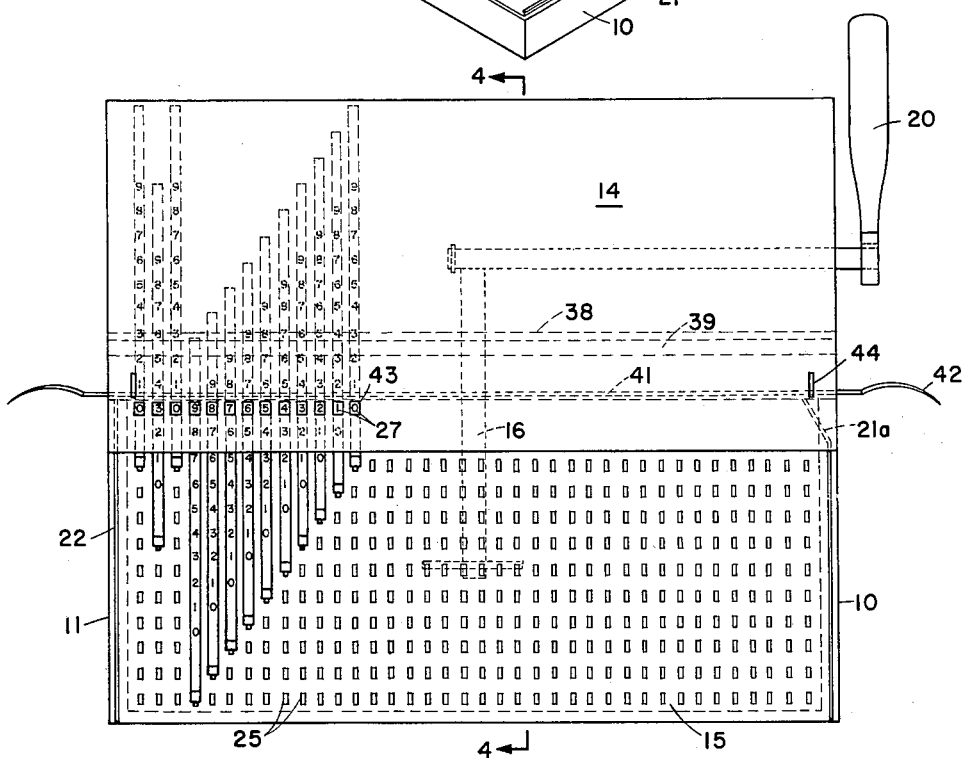
Figure 3:
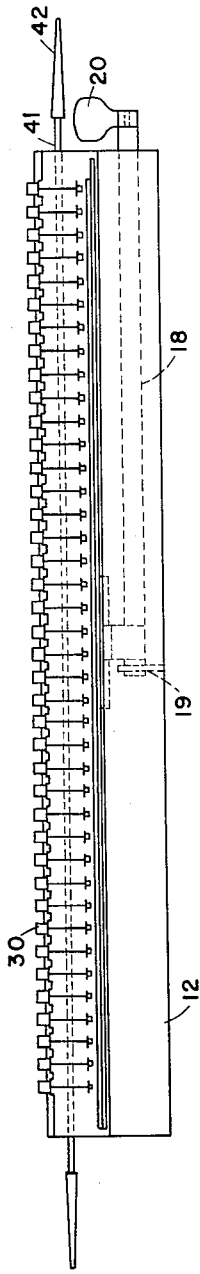
Figure 4:
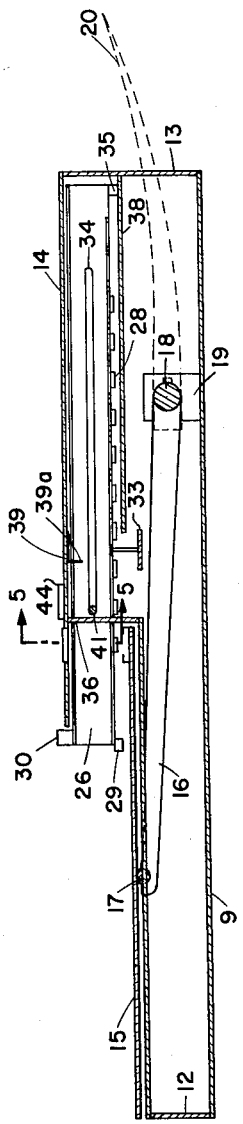
Figure 5:
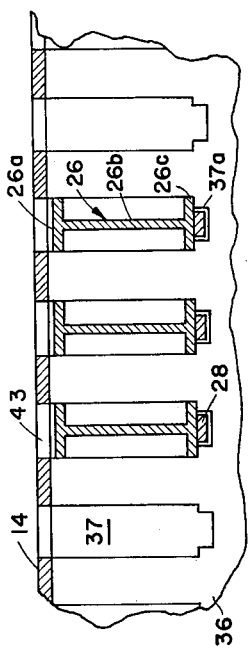

The invention will be further described with reference to the accompanying drawings showing by way of illustration one preferred embodiment thereof, in which:

FIGURE 1 is an isometric view of the device, parts being broken away;
FIGURE 2 is a plan view, some of the punch bars being omitted;
FIGURE 3 is a front elevation;
FIGURE 4 is a sectional view taken on the line 4—4 of FIGURE 2 and drawn to an enlarged scale; and
FIGURE 5 is a sectional view taken on the corresponding line 5—5 of FIGURE 4.

Referring to the drawings in detail, the machine includes a base having a bottom plate 9, vertical side frame plates 10, 11, a front frame plate 12 and a rear frame plate 13. A top cover plate 14 extends over the rear part of the base.

A die plate 15, which serves as a card holder, is movably mounted on the frame for up-and-down motion in a horizontally restrained path by means of a lever 16 which is pivoted to the plate through a reinforcing bar 17 and is fixed to an operated shaft 18. This shaft is mounted for rotation in a standard 19 carried by the plate 9 and further in the frame plate 10. The shaft carries an operating lever or print-punch bar 20, which can be depressed to raise the die plate. The die plate further carries at each side margin a sheet metal positioning guide 21 or 22, the top of which extends over the plate in spaced relation to retain a cord. The rear portion of the guide 21 may optionally be angularly disposed, as shown at 21a, to fit the clipped corner of a card, whereby the card can be inserted only in correct orientation. The rear of the guide 22 is closed to limit the card movement. A ribbon guide comprising channelled strips 23 and 24 is mounted in fixed relation and vertically spaced along the rear of the plate for positioning an inked ribbon along a row across the top of the card. These strips are fixed at their ends to the guides 21 and 22. The plate has a plurality of holes 25, arranged in columns A, B, C, etc., at potential punching positions. These holes have the shapes of the holes to be punched into the card.

The machine has a plurality of print-punch bars 26, one for each column of holes in the die plate, extending parallel to said columns. As is seen in FIGURES 1 and 5, they may have the cross-sectional shape of an I beam, including a top flange 26a, a web 26b and a bottom flange 26c. The upper flange carries visible indicia, such as engraved numbers 27 which may be numbers from 0 through 9, spaced apart at distances equal to the distance between the holes 25 with the columns. The lower flange carries a series of printing type elements 28, such as embossed numbers corresponding to and spaced like the numbers 27 and, at the front, a downwardly directed punch 29, positioned to enter any of the holes 25 within the corresponding column. A stop lug 30 at the front of each bar projects upwards and engages the front edge of the plate 14 when the bar is fully retracted, with the punch 29 above the uppermost or rear hole 25; it also serves as a knob by which the bar can be set manually. The lower flange 26c further has a series of serrations 31 for cooperation with resilient detent fingers 32 which are carried by a transverse plate 33 fixed to the base in spaced relation below the bars. These serrations are spaced as are the holes 25 and are positioned to retain the bar 26 with its punch 29 directly above one of the holes. The embossed type elements 28 are positioned so that when the punch is above any hole 25, the corresponding type element which denotes the number of the hole in the column, is above the ribbon guide, between the strips 22 and 23. The web 26b has an elongated slot 34. The rear end of each bar carries a spacer lug 35 which extends downwards from the flange 26c slightly below the type elements 28.

The bars 26 are mounted in any suitable guide structure to insure sliding movement with the punches 29 occupying positions above the holes 25 of the respective columns, and to restrain the bars against upward movement of the punches. In the embodiment shown the guide structure includes front and rear guide elements. The former comprises a top abutment constituted by the top plate 14. The bars are guided laterally and supported at the front and the plate 14 is reinforced by a vertical plate 36 which extends across the base above the lever 16 and somewhat to the front of the plate 33 and has a series of vertical slots 37 for accommodating the bars 26. These slots engage the sides of the flanges 26a and 26b. The bottom of each slot has a groove 37a which is narrower than the width of the flange 26c and of such size as to permit the embossed type elements 28 to pass without contact; in other words, only the margins of the bottom flange 26c rest on the plate 36.

The rear guide structure comprises a shelf 38 carried by the side frame plates 10 and 11 to support the rear ends of the bars slidingly by their spacer lugs 35 without frictional contact with the type elements. It may further comprise a thin transverse plate 39 which is fixed to the top plate 14 and has bent-down fingers 39a which extend between the upper parts of the bars to engage the sides of the top flanges 26a.

The side frame plates 10 and 11 have horizontal slots 40. A reset bar 41 extends transversely through the slots 40 and through the slot 34 of each print-punch bar and has a pair of handles 42 at the ends. The slots 34 and 40 are coextensive so that the rear ends of the former are engaged by the reset bar when the bar is in its rearmost position. The reset bar can, however, be slid forward through these slots without shifting the bars.

The top plate 14 has a series of windows 43, through which only one of the indicia 27 of each bar may be read at one time. They form an index means for said indicia. The windows 43 are positioned in relation to the indicia so that when the punch 29 is above one of the holes 25 the corresponding number 27 appears. The rear ends of the slots 34 form abutments which are engaged by the reset bar 41 when the latter is moved rearwards. These slots are of such length that when the reset bar is pushed rearwards all of the bars 26 are reset with their stop lugs 30 in engagement with the front edge of the plate 14; in this poistion the punch 29 is above the uppermost hole 25 in its respective column, the number 0 appears in the corresponding window 43, and the embossed type number 0 is above the ribbon guide.

The cover plate 14 may be provided with clips 44 for holding a card with headings for the various columns.

The punches 29 may be formed to fit snugly in the holes 25 and this relation is used when plain cards (without prescoring) are to be punched. In this case the various parts must be accurately machined to insure precise alignment of the punches with the holes. However, the machine can be produced economically and without precision workmanship by making the punches small in relation to the holes, e.g., to have frontal areas less than half of the hole area, so as to enter the holes with clearance despite some play or misalignment. In the latter construction the machine is adapted to punching prescored cards, wherein each potential hole position is outlined by scoring the card board.

Operation is as follows: An inked or carbon-coated printing ribbon is placed into the ribbon guide 23—24 and a suitable heading or legend card is inserted into the clips 44. The reset handles 42 at the ends of the reset bar 41 are engaged manually and pushed back to cause the reset bar to slide in its grooves 40 from its normal forward position shown toward the rear, thereby engaging during such rearward movement those print-punch bars 26 which are initially at positions other than rearmost and carrying them back until all are in their fully retracted positions; the bar is then again moved to the front. It will be understood that during the above-described rearward movement of the bar 41 the latter slides along the grooves 34 until it engages the rear ends of the grooves and thereafter carries the bar or bars back; and that bars having different initial positions are thus engaged sequentially. A card is inserted onto the die plate 15 beneath the marginal guides 21 and 22, so that the rear (top) edge is positioned under the ribbon and above an imperforate area of the die plate. Each print-punch bar is engaged manually by its stop 30 and pulled forward until the value desired for the corresponding column appears in the window 43, indicated by the engraved number 27. The information shown in the window is verified visually. The print-punch bar or lever 20 is then depressed, thereby rotating the shaft 18 and forcing the die plate 15 upwards against the print-punch bars. This effects simultaneous punching of holes by the punches 29 and printing of the punched data by the embossed type elements 28. The bar 20 is then raised to lower the die plate and the card is removed. If another card is to be punched with the same data, a fresh card is inserted in the print-punch bar 20 again actuated.

It is evident that when only a few elements of data are different in successive cards it is only necessary to shift the corresponding print-punch bars.

By providing a plurality of individually and manually settable bars or keys 26, such that there is one key for each column of the record to be punched, checking of the key settings prior to performing any punching is made possible and the machine can be operated with lessened chance of error, even by inexperienced operators.

I claim as my invention:

1. A record-issuing machine operable in a single cycle for punching data into records which comprises, in combination: a die plate for supporting the record, said plate having a plurality of holes arranged in columns; a plurality of individually settable punch bars, each said bar having a punch shaped to enter said holes and positioned on the bar for successive alignment with the holes of a column as the bar is set; a frame for said punch bars having guide means in which the bars are slidable, said guide means providing restraint against motion of the bars other than said sliding motion, said die plate being mounted for movement relatively to said frame; and means for effecting an approach motion between said punches and said die plate to cause said punches to enter the aligned holes and to perforate the record simultaneously at the said aligned holes.

2. A record-issuing machine according to claim 1 wherein said punches are smaller than the said holes, whereby said punches can enter the holes despite deviations from alignments.

3. In combination with the machine according to claim 1, a plurality of spaced type elements on each said punch bar indicating successive holes in a column and disposed for printing on said record when on the die plate, said type elements being positioned on each bar for successive juxtaposition, as the bar is set, with a row on the die plate which is transverse to said columns, said plate providing at said row a support for placing said record into printing relation simultaneously to type elements on different bars.

4. In combination with the machine according to claim 3, a ribbon guide extending along said row above said die plate for supporting a printing ribbon between the record and the type elements.

5. In combination with the machine according to claim 1, a plurality of directly readable indicia on each of said punch bars indicating successive holes in a column and positioned in spaced relation on the bar for successive juxtaposition, as the bar is set, with a reading line which is transverse to said columns, and index means demarcating the said reading line, whereby the positions of the several bars can be read simultaneously prior to effecting said approach motion.

6. In combination with the machine according to claim 1, abutment means on each of said punch bar, and a manually operable reset bar mounted for translatory motion to engage the said abutment means on the several punch bars for restoring the bars to a common position.

7. A record-issuing machine according to claim 1 wherein the said means for effecting an approach motion includes a lever pivotally mounted to said frame and having a part thereof operatively connected to the die plate for moving it against the punches.

8. A record-issuing machine operable in a single cycle for simultaneously punching data into and printing data onto record cards which comprises, in combination: a base; a die plate movably mounted on said base for up-and-down movements in a restrained path, said plate having a plurality of holes arranged in columns; a ribbon guide extending along a row on the die plate which is transverse to said columns for supporting a printing ribbon above a record card on the plate, said plate providing a printing support for the record card beneath said ribbon guide; a manually operable actuating lever mounted on said base and arranged for raising the said die plate; guide means on said frame providing a plurality of slide channels extending parallel to said columns; an individually settable punch bar slidably mounted in each of said channels, each said punch bar having on the under side thereof a punch positioned and shaped for successive alignment with the holes of one column as the punch bar is slidably set and to enter the aligned hole and perforate the record card when the plate moves upwards; and a plurality of type elements on the under side of each punch bar indicating successive holes in a column and positioned in spaced relation thereon so as to be positioned successively above said ribbon guide as the bar is slid to align the punch thereon with successive holes of a column, said type elements being positioned to be in printing relation to said record when the plate is in its upward position.

9. In combination with the record-issuing machine according to claim 8, a plurality of directly readable indicia on the upper side of each said punch bar indicating successive holes in a column and situated in spaced relation for successive juxtaposition with a reading line when the bar is slid to align the punch thereon with successive holes of a column; and index means on said base demarcating the said reading line, whereby the positions of the several bars can be read simultaneously prior to operating the lever.

References Cited in the file of this patent
UNITED STATES PATENTS

| | | |
|---|---|---|
| 1,321,348 | Willis | Nov. 11, 1919 |
| 1,430,014 | Hyman | Sept. 26, 1922 |
| 1,602,874 | Baillie | Oct. 12, 1926 |
| 1,827,180 | Williams | Oct. 13, 1931 |
| 1,830,779 | Boulton | Nov. 10, 1931 |
| 1,919,219 | Hoffman | July 25, 1933 |
| 1,944,671 | Schaaff | Jan. 23, 1934 |
| 2,047,939 | Catucci | July 21, 1936 |
| 2,050,745 | Woodruff | Aug. 11, 1936 |
| 2,195,844 | Von Pein | Apr. 2, 1940 |
| 2,211,680 | Whitaker | Aug. 13, 1940 |
| 2,874,632 | Collins | Feb. 24, 1959 |